Nov. 27, 1945. C. F. RAMSEYER 2,389,636
CRACKING HYDROCARBON GASES AND VAPORS
Filed Oct. 19, 1943
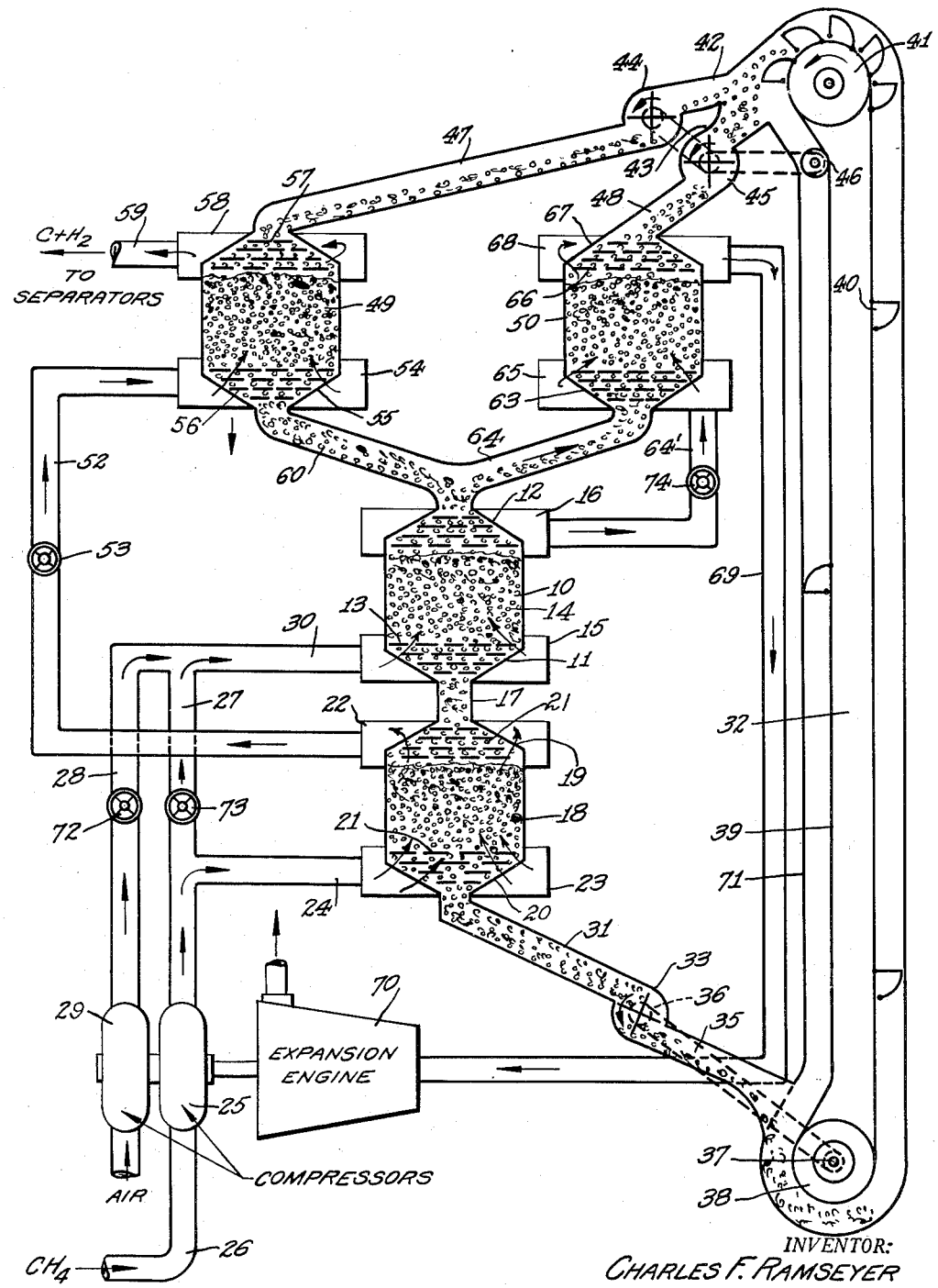
INVENTOR:
CHARLES F. RAMSEYER
BY
ATTORNEYS Patented Nov. 27, 1945

2,389,636

UNITED STATES PATENT OFFICE 2,389,636

CRACKING HYDROCARBON GASES AND VAPORS

Charles F. Ramseyer, Old Greenwich, Conn., assignor to H. A. Brassert & Company, New York, N. Y., a corporation of Illinois Application October 19, 1943, Serial No. 506,839

5 Claims. (Cl. 196—55)

This invention relates to cracking hydrocarbon gases and vapors, and has particular reference to methods and apparatus for cracking a hydrocarbon gas or vapor in order to obtain hydrogen and carbon as separate products in relatively pure form.

Hydrocarbon gases and vapors, such as natural gas and oil vapors, are susceptible to cracking at high temperatures, and this is commonly effected by bringing them into contact with heated regenerator refractories or flue walls or by contact with incandescent solid fuel. Specifically, these methods are used for the production of hydrogen from methane, the principal constituent of natural gas, or other gaseous volatile or vaporized liquid hydrocarbons. One of the most effective and efficient methods heretofore employed is that involving the use of incandescent fuel, but that method has the objection that it necessitates intermittent blasting, which is not conducive to high efficiencies and also that much of the valuable carbon black produced as a by-product is not recoverable. The other method, employing heat stored in refractory structures, has the objection that it is inherently inefficient, as is the case with all intermittent regenerative systems. Thus, there are at least two sources of heat loss in any hydrocarbon hot cracking system, viz., the sensible heat of the waste heating gases, and the sensible heat of the hot cracked gas leaving the hot checker work or other hot surfaces used for the cracking operation.

In accordance with the present invention, methods and apparatus are provided for cracking hydrocarbon gases and vapors, especially for producing hydrogen with carbon black as a by-product, in which the sensible heat of the flue gases used for heating the hot contact elements for effecting the cracking operation is recovered, as well as the sensible heat of the cracked gases discharged by the system, and substantially all of the carbon black, all without the use of regenerative or other intermittent systems which are inherently inefficient for the reasons mentioned.

The invention consists in heating ceramic, metal, or other refractory elements or pebbles, in a heating zone to the temperature necessary for cracking the hydrocarbon gas, during which any carbon which has adhered to the elements by reason of previous use in the system is burned off, after which the heated refractory elements then flow by gravity into and through a cracking chamber countercurrently to the flow of the gas to be cracked. As the result of the cracking operation, the elements are cooled materially and, upon discharge from the cracking zone, are returned to a pair of heat exchanging zones, between which the returned elements may be divided in such proportion as is found by experience to give the best efficiency when cracking a given hydrocarbon; the decomposition of different hydrocarbons requiring varying amounts of heat, the relative quantity of which will vary between that required to heat the gas and that required to chemically break down the gas molecule. This will result in a varying ratio of waste sensible heat between the cracked gas and the flue gas.

In one of these two zones, the cool elements are preheated as the result of countercurrent flow to the hot flue gases discharged from the combustion zone in which the elements were originally heated, and the cool elements fed to the second preheating zone are preheated by the sensible heat in the cracked gases which are conducted countercurrently to the flow of the elements through this second preheating zone. Upon discharge from these two preheating zones the two batches of elements are combined and returned to the combustion zone for reheating and the cycle is completed.

Notwithstanding inter-connection between the various zones described, the gases being treated or resulting from the reactions in the various zones, are maintained substantially separate by maintaining a slightly higher pressure in the cracking zone than in the combustion chamber, so that the combustion gases do not flow from the combustion zone into the cracking zone, but on the contrary, the gases or vapors being cracked bleed slightly from the cracking zone into the combustion zone and are there burned. Likewise, the pressures in the two preheating zones and the combustion zone are so balanced as to give a slight flow of the cracked gases into the combustion zone, so that the entire system, which also includes the transferring means for returning the elements from the cracking zone to the preheating zones, is in substantial equilibrium.

The apparatus for conducting the series of steps described comprises a combustion chamber, constituting the heat-supplying adjunct to the heating zone, in which the recycled refractory elements are heated and which is arranged above the cracking chamber to which it is connected by a conduit for gravity flow of the heated elements into the cracking chamber. The gas or vapor to be cracked is supplied from below for flow through the cracking chamber countercurrently to the descent of the heated elements and the resulting contact between them causes the gas or vapor to be cracked. The elements are cooled both by the cold incoming gas and by the endothermic cracking reaction and are conveyed from the cracking chamber to the lower end of an elevator of the chain and bucket type, enclosed in a housing and discharging to two variable speed mechanical feeders which divide the elements and feed them into two preheating chambers constituting the aforementioned preheating zones. The hot cracked gases from the cracking chamber and the hot flue gases from the combustion chamber are separately supplied to these preheating chambers for counterflow to the descending cold elements to preheat them in the manner described.

Both preheating chambers are connected by conduits conducting the elements to the upper portion of the combustion zone for superheating in the manner described. The cracked gases and entrained carbon, cooled by their counterflow with the elements in the corresponding pebble preheating zone, are conducted to a suitable washer and precipitator, for recovery of the carbon black and separation therefrom of the cracked product gas, which, if methane or natural gas is the gas that is cracked, will be substantially entirely hydrogen.

The pressure of the flue gas may be employed to drive a gas turbine or other expansion engine connected to a turbo-blower to supply combustion air to the combustion chamber under pressure, and the turbine may also be employed to compress the gas to be cracked, as well as the fuel employed in the combustion chamber. In this way a relatively high pressure in the entire system may be employed without expenditure of additional power for that purpose, and the products of the cracking operation can be recovered at high pressure. Accordingly, the entire equipment may be made comparatively small and of high capacity, due to the decrease of gas volume made possible by the increased pressure.

It will be seen that a very efficient, simple, compact, and continuous system for cracking hydrocarbon gases and vapors to produce a valuable by-product carbon is provided by this invention, with maximum recovery of sensible heat, with a minimum of moving parts and without the use of any cumbersome and inefficient intermittent and regenerative mechanism.

For a more complete understanding of the invention, reference may be had to the accompanying diagrammatic representation of a preferred arrangement of the apparatus of this invention, in which the method of this invention may be carried out. In this drawing, numeral 10 designates the element-heating chamber which may constitute a steel shell lined with suitable refractory material to withstand the temperature to which it is subjected. The shape of the chamber 10 is preferably cylindrical, with a conical hopper bottom 11 and a conical dome 12, the hopper 11 and the dome 12 being pierced with slots 13 of dimensions such as to preclude unintended escape of the heating elements 14 therefrom into the corresponding bustle rings 15 and 16, with which the slots communicate.

The circulating refractory elements 14 are preferably formed of ceramic material, although they may be metal, and are preferably spherical and as large as will stand up in operation, up to approximately one in in diameter to provide substantial voids between each other through which the gas flows in the cracking chamber, and also to offer a minimum surface on which carbon may deposit during the cracking operation.

The hopper 11 discharges into a tube 17 leading into the upper end of cracking chamber 18, which preferably is shaped similarly to combustion chamber 10, and likewise is lined with suitable refractory material. The dome 19 and the hopper 20 of cracking chamber 18 are pierced with slots 21 similar to slots 13 of combustion chamber 10, slots 21 in the dome 19 communicating with upper bustle ring 22, and the slots 21 in the hopper 20 communicating with the lower bustle ring 23.

The lower bustle ring 23 of cracking chamber 18 is supplied with the hydrocarbon gas or vapor to be cracked by means of pipe 24 from a blower 25, supplied by pipe 26 from a gas holder or other source, not shown. Part of the combustible hydrocarbon gas or vapor may be employed to heat the heating chamber 10 and to that end it may be supplied from blower 25 through pipe 27 to the bustle ring 15 for combustion therein. Air for supporting combustion in bustle ring 15 is supplied under pressure through pipe 28 from a suitable blower 29. Mixing of the gas from pipe 27 and the combustion supporting air from pipe 28 may take place in a burner or other injection arrangement 30 at the entrance to bustle ring 15 so that practically all combustion takes place within the latter; although any uncompleted combustion takes place or continues within the heating chamber 10. Thus, ring 15 and chamber 10 are considered herein as respectively constituting the combustion zone and the heating zone. The gaseous products of combustion flow out of bustle ring 15 through slots 13 into and through heating chamber 10 and out of upper bustle ring 16 for further use, as will be described.

The refractory elements 14 collecting in hopper 20 of cracking chamber 18 are gravitationally discharged therefrom by a conduit 31 to the lower end of an elevator 32, the flow through conduit 31 to elevator 32 being controlled by a star wheel type of feeder 33, which also serves as a gas seal and which is driven at the prescribed rate by a chain 35 connecting a sprocket 36 thereon and sprocket 37 on drive sprocket 38 of the elevator 32. The chain 39 of the elevator 32 carries the usual buckets 40 at spaced intervals and passes over an upper sprocket 41 so as to discharge the contents of the successive buckets 40 jointly into two conduits 42 and 43, the flow through the conduits being regulated by respective star wheel feeders 44 and 45 driven from an idler sprocket 46 driven by the elevator chain 39.

Feeders 44 and 45 supply the proper amounts of the refractory elements to respective conduits 47 and 48, as is found desirable in practice for the most efficient operation and discharge the elements into the upper ends of preheating chambers 49 and 50, respectively. Preheating chambers 49 and 50 preferably have configurations similar to combustion chamber 10 and cracking chamber 18.

The preheating chamber 49 is traversed by upwardly flowing hot products of the cracking reaction supplied thereto through slots 56 communicating with bustle ring 54 connected to bustle ring 22 of cracking chamber 18 through pipe 52 controlled by valve 53. The hot products of the reaction are cooled by transferring their sensible heat to the refractory elements flowing countercurrently therethrough in chamber 49, and the cooled gases are then discharged through slots 57 into bustle ring 58 and from there are led by pipe 59 to washers and to precipitators, preferably of the Cottrell type, for recovery of carbon black and separation of the uncondensible gases from the condensible vapors and the solids.

The refractory elements that are preheated in chamber 49 collect in the hopper 55 thereof and are discharged therefrom by gravity through tube 60 into the upper end of heating chamber 10 through which they descend countercurrently through the hot combustion gases flowing from bustle ring 15 upwardly through heating chamber 10 to be heated thereby.

Similarly, the other part of the cool refractory elements discharged into the upper end of the other preheating chamber 50 are distributed uniformly therethrough and move downwardly to collect in the hopper 63 by which they are discharged through tube 64 to join the other portion of the elements entering heating chamber 10 through tube 60 as described. The hopper 63 of preheating chamber 50 is slotted and supplied with the hot flue gases from upper bustle ring 16 of heating chamber 10 through pipe 64' and bustle ring 65, so that the hot gases flow upwardly through preheating chamber 50 countercurrently to the descending refractory elements, which are accordingly preheated. The cooled flue gases flow out through slots 66 in the dome 67 to be collected in bustle ring 68 for discharge by pipe 69 or through the pebble feed pipe 48, depending on the design.

Inasmuch as the combustion supporting air and the gas to be cracked are supplied under pressure from respective pumps or compressors 29 and 25, the closed system just described is under pressure and consequently the pressure of the flue gases flowing through pipe 69 may be employed to operate a suitable expansion engine 70, such as a gas turbine, which may be employed to drive one or both of the compressors 25 and 29, depending upon the degree of the drop in pressure in the flue gases supplied to turbine 70. Alternatively, the air, the gas to be cracked, or the fuel may be separately compressed by a separate compressor or compressors. All of the joints between the various conduit tubes, piping and chambers just described are sealed and the elevator 32 is enclosed in a sealed housing 71 so that the desired superatmospheric pressure mentioned may be maintained in the system.

In operation, the gas to be cracked, which may be natural gas of high methane content, for example, is supplied by pipe 26 to compressor 25, which feeds it at the requisite pressure to lower bustle ring 23, from which it flows through slots 21 into and upwardly through cracking chamber 18. The pressure of the gas entering bustle ring 23 may be on the order of 16 pounds per square inch gauge, and the temperature of the hot elements distributed through cracking chamber 18 countercurrently through the upwardly flowing gas may be 2400° F. or other temperature necessary for cracking the particular gas under consideration. In order to supply this cracking temperature, the refractory elements 14 are heated to a temperature somewhat above 2400° F., and heating chamber 10 maintained at a temperature of approximately 2700° F. for that purpose. The fuel, such as the gas or vapor to be cracked, with combustion supporting air, are supplied to bustle ring 15 by pipe 30 in quantities regulated by valves 72 and 73. The fuel is burned in bustle ring 15 so as to heat the refractory elements accordingly. The initial heat is supplied to the elements by the heating chamber 10 as they fall by gravity therethrough in the manner described, and the final heat is supplied exteriorly through the wall of the hopper 10 from the bustle ring 15, and by direct contact with the hot gas issuing through slots 13 into the chamber. Any coating of carbon which may adhere to the elements as the result of the cracking operation is burned off in chamber 10.

As the result of the cracking of the hydrocarbon gas or vapor in cracking chamber 18, the refractory elements are materially reduced in temperature to approximately 300° F. and are fed at a uniform controlled rate by feeder 33 to the elevator 32, which transports them up to the two conduits 42 and 43 for division by feeders 44 and 45 between conduits 47 and 48 by which they are conducted to the preheating chambers 49 and 50. The refractory elements at about 250° F. are preheated in chambers 49 and 50 by flowing countercurrently through the hot products of the cracking operation, and the hot flue gases, respectively. The cracked gases issuing from cracking chamber 18 have a temperature of approximately 2100° F. and consequently the elements are heated in preheating chamber 49 to approximately 2000° F. The cracked gases with entrained carbon black accordingly are cooled to approximately 350° F. at which temperature they issue from chamber 49 to discharge pipe 59.

Similarly, the hot flue gases issue from heating chamber 10 through pipe 64 at a temperature of approximately 2100°, and accordingly heat the refractory elements in chamber 50 to approximately 2000° F., from a temperature at about 250° F., at which they enter preheating chamber 50. The cooled flue gases issuing from preheating chamber 50 through pipe 69 are supplied to turbine 70 at a temperature of approximately 350° F.

In order to preclude leakage of combustion gases from heating chamber 10 into cracking chamber 18, the pressure within the latter is maintained slightly greater than that within heating chamber 10. For example, if the pressure in cracking chamber 18 is maintained at 11 pounds per square inch gauge, the pressure in heating chamber 10 is maintained at about 10.9 pounds per square inch gauge. This pressure differential results in some leakage of gas or vapor upwardly from cracking chamber 18 into heating chamber 10, but inasmuch as the bleed gas is combustible it burns in chamber 10 and consequently its sensible heat and the heat of combustion are recovered. Also, a sufficient pressure is maintained within the preheating chamber 49 to preclude leakage of flue gases from chamber 10 into chamber 49 containing the combustible products of the cracking operation. Accordingly, by means of valve 53 the pressure in chamber 49 may be regulated so that, if the pressure in the upper portion of heating chamber 10 is six pounds per square inch gauge, the pressure in preheating chamber 49 is maintained slightly greater than that, for example, 6.1 pounds per square inch gauge.

In order to balance the pressure within tubes 60 and 64 leading from preheating chambers 49 and 50 to heating chamber 10, the pressure in the second preheating chamber 50 is also maintained approximately equal to that in chamber 49 and the upper portion of heating chamber 10, with the pressure in chamber 49 slightly higher than in the chambers 10 and 50. Accordingly, there is a tendency for a downward leakage of cracking products from preheating chamber 49 through tube 60 where it divides, part of it flowing through tube 64 into chamber 50 and part of it flowing downwardly into heating chamber 10, although it is essentially immaterial whether this flow is downwardly to or upwardly from heating chamber 10 at this point, so long as there is no upward flow of the flue gases through tube 60 into preheating chamber 49. In order to more accurately regulate the pressure in preheating chamber 50 the pipe 64' supplying the flue gas thereto from heating chamber 10 may be provided with a throttling valve 74.

The feeder 33 in conduit 35 leading to housing 71 and the feeders 44 and 45 in the conduits 47 and 48 leading from the upper end of housing 71 also act as gas seals and consequently housing is maintained at a pressure that is the average between that in chamber 18 on the one hand and chambers 49 and 50 on the other.

Although preferred embodiments of the method and apparatus of this invention are illustrated and described herein, it is to be understood that the invention is not limited thereby, but is susceptible to change in form and detail within the scope of the appended claims.

I claim:

1. The continuous method of cracking hydrocarbon gases or vapors by contact with recycled hot elements, which comprises heating the elements in a heating zone, feeding the hot elements from the heating zone to a cracking zone countercurrently to a stream of the gas or vapor to be cracked, preheating the elements discharged from the cracking zone with the products of the cracking operation, and returning the elements to the heating zone for reheating to repeat the cycle.

2. The continuous method of cracking hydrocarbon gases or vapors by contact with recycled hot elements, which comprises heating the elements in a heating zone by the heat of fuel combustion, feeding the hot elements from the heating zone to a cracking zone countercurrently to a stream of the gas or vapor to be cracked, dividing the elements discharged from the cracking zone in two parts, preheating one part of said elements with the products of the cracking operation, preheating the other part of said elements with the products of combustion from the heating zone, and returning the elements to the heating zone for reheating to repeat the cycle.

3. The continuous method of cracking hydrocarbon gases or vapors by contact with recycled hot elements, which comprises heating the elements in a heating zone by the heat of fuel combustion, feeding the hot elements from the heating zone to a cracking zone for gravity flow therethrough, supplying a stream of the gas or vapor to be cracked through the cracking zone countercurrently to the flow of said elements therein to heat the gas or vapor to the cracking temperature by contact with said hot elements, discharging the cool elements from the cracking zone, preheating part of the cool elements with the hot products of the cracking operation issuing from the cracking zone, preheating the other part of the cool elements with the hot products of combustion from the heating zone, and returning the elements to the combustion zone for reheating to repeat the cycle.

4. The continuous method of cracking hydrocarbon gases or vapors by contact with recycled hot elements, which comprises heating the elements in a heating zone by the heat of fuel combustion, feeding the hot elements from the heating zone to a cracking zone for gravity flow therethrough, supplying a stream of the gas or vapor to be cracked through the cracking zone countercurrently to the flow of said elements therein to heat the gas or vapor to the cracking temperature by contact with said hot elements, discharging the cool elements from the cracking zone, dividing the cool elements into two parts, preheating one part in a preheating zone by flowing the same countercurrently to the hot products of the cracking operation, preheating the other part of said elements in a second preheating zone by flowing the same countercurrently to the hot products of combustion from the heating zone, recombining the preheated elements from the two heating zones, and returning the preheated elements to the heating zone for reheating therein to repeat the cycle.

5. In a continuous system for cracking hydrocarbon gases or vapors by contact with recycled hot elements, the combination of a heating chamber for heating the elements by the heat of fuel combustion, a cracking chamber, conduit means between said chambers for conducting the hot elements from said heating chamber to said cracking chamber for gravity flow therethrough, supply and discharge means leading to and from said cracking chamber for flow of said gas or vapor therethrough countercurrently to the flow of said elements therethrough, means for collecting the hot products of the cracking operation from said cracking chamber, means for collecting the hot flue gases from said heating chamber, a first preheating chamber, a second preheating chamber, several connections between said collecting means and said preheating chambers, means for transferring said elements from said cracking chamber jointly to said two preheating chambers for preheating therein by heat exchange with the respective hot gases therein, said transfer mechanism including means for dividing said elements substantially equally between said two chambers, and conduit means leading from said two preheating chambers to said heating chamber for returning the elements thereto to repeat the cycle.

CHARLES F. RAMSEYER.

CERTIFICATE OF CORRECTION.

Patent No. 2,389,636. November 27, 1945.

CHARLES F. RAMSEYER.

It is hereby certified that error appears in the printed specification of the above numbered patent requiring correction as follows: Page 2, first column, line 73, for "in" first occurrence, read --inch--; page 4, second column, line 9, claim 3, for "combustion" read --heating--; and that the said Letters Patent should be read with this correction therein that the same may conform to the record of the case in the Patent Office.

Signed and sealed this 12th day of February, A. D. 1946.

Leslie Frazer (Seal) First Assistant Commissioner of Patents.